3,200,059
POLYMER PURIFICATION
William C. Mills, Pasadena, Tex., assignor to Celanese Corporation of America, New York, N.Y., a corporation of Delaware
No Drawing. Filed Sept. 29, 1961, Ser. No. 143,996
5 Claims. (Cl. 204—186)

This invention relates to the removal of impurities from polymers.

Various processes are known for the production of high molecular weight polymers in the course of which a liquid comprising the polymer is obtained which contains impurities difficult to separate from the polymer and adversely affecting its properties. For example, several processes have been developed in recent years for the production of polymers of polymerizable unsaturated monomers, particularly hydrocarbon monomers such as ethylene and propylene, wherein a catalyst comprising any of various metallic or other ash-yielding compounds is employed and the polymerization is carried out at moderate temperatures and pressures with the monomer dissolved in or dispersed in a suitable inert liquid medium. The catalyst may be, for example, chromium oxide containing some hexavalent chromium at the start of the reaction and supported on a carrier comprising silica, alumina, thoria, and/or zirconia as more fully described in U.S. Patent 2,825,721, or a combination of an organometallic compound, e.g. an aluminum trialkyl or a metal hydride with a heavy metal compound wherein said metal has a valence above its most reduced state, e.g. a titanium halide such as titanium tetra- or trialkoxy compound, as more fully described, for example, in Belgian Patent Nos. 536,617 and 538,782. While the processes employing these "heterogenous ionic" catalysts are capable of yielding polymers which are considerably less branched than polymers obtained by means of the older free radical yielding catalysts, and which have higher molecular weight, a greater degree of crystallinity, greater rigidity and hardness, and higher tensile strength, they also may cause certain residues to remain in the polymer which may adversely affect its stability and result in undesirable color and odor. Although it is possible to substantially reduce these residues from the polymer solution obtained in the course of the process, using for example filtration and centrifugation techniques, such techniques are often difficult and expensive to carry out.

It is an object of this invention to provide a process for the removal of undesirable impurities from high molecular weight polymers. It is a further object of this invention to provide a process for the treatment of a solution of a linear polymer such as polyethylene obtained in the course of a polymerization process utilizing a catalyst which results in the presence of an undesirable residue in said solution, whereby the amount of such residue is substantially reduced. Other objects will be apparent from the following description and claims.

In accordance with one aspect of the invention, a liquid comprising a polymer and containing an undesirable residue is treated by first mixing into said liquid a small amount of a polar liquid immiscible with said polymer-containing liquid to form an emulsion wherein the polar liquid is the discontinuous phase, subjecting the emulsion to the action of an electric field such that a substantial portion of the residue migrates to the polar liquid phase or, in the case of some ash particles coated with polymer, to the interface between the polar liquid and polymer phases, and the polar liquid phase coalesces, and separating the coalesced polar liquid phase containing a substantial proportion of the residue from the polymer solution. In some cases a mixture of polar liquid and organic phases containing polymer-coated ash particles is also removed from the interface separating the two phases. Liquid so treated is capable of yielding a polymer having a substantially reduced content of undesirable residue. The term "residue" as used in this application includes that which is classified as, or is convertible into ash, and also color and odor-causing bodies which are not convertible into ash.

By the term "polar liquid" is meant a liquid having a dipole moment greater than zero. In addition to being immiscible with the polymer-containing liquid, the polar liquid should have a different enough density to separate readily after it coalesces. While water is the preferred polar liquid because of its cheapness, availability, etc., other polar liquids may also be used, e.g. glycerol, ethylene glycol, etc.

The process of this invention may be used to remove undesirable residues from a wide variety of polymer-containing liquids, especially solutions of linear hydrocarbon polymers, e.g. of 1-olefins such as ethylene, propylene, butene-1, 3-methyl butene-1, pentene-1, and 4-methyl pentene-1 or mixtures of such monomers in hydrocarbon solvents. It is particularly useful in the treatment of polymer solutions obtained in the course of polymerizing ethylene utilizing a catalyst comprising chromium oxide associated with at least one oxide selected from the group consisting of silica, alumina, zirconia, and/or thoria as more fully described in Patent No. 2,825,721. In this process at least one polymerizable olefin, e.g. ethylene is contacted with the catalyst which may contain, for example, 0.1 to 10% based on the weight of the catalyst of chromium, at least part of which is in the hexavalent state at the start of the reaction, at a temperature up to 500° F., e.g. 150 to 450° F. for a period of time sufficient to produce the desired polymer. Preferably the polymerization is carried out in the presence of an inert normally liquid solvent, most suitably a hydrocarbon having a zero dipole moment, at a pressure sufficient to maintain a liquid phase around the catalyst. Inert solvents which may be employed in carrying out this type of process are, for example, paraffins and cycloparaffins containing 3 to 12 carbon atoms such as cyclohexane, normal pentane, isopentane, normal hexane, the isohexanes, normal heptane, the isoheptanes, normal octane, isooctane (2,2,4-trimethylpentane), normal nonane, the isononanes, cyclopentane, and methylcyclohexane. It has been found that the treatment is particularly effective in reducing the undesirable residue of polymer solutions obtained in the course of such process.

The treatment may be also used to remove undesirable residues, including ash, from solid polymers obtained in the absence of solvents, e.g. from bulk or aqueous emulsion polymerization. In this case it is necessary to dissolve the polymer in an inert solvent before the treatment is initiated.

In carrying out the treatment of this invention a polymer solution containing for example 0.1 to 20% of polymer and 0.005 to 2.0% of ash based on the weight of polymer, and having a viscosity of 0.2 to 200 centipoises at 275° F., is mixed with water in an amount of for example 0.1% to 20% based on the volume of the polymer solution. In general, the water and polymer solution may be supplied under any conditions of temperature and pressure at which they remain in the liquid stage and at which polymer does not precipitate out. However, the polymer solution may be suitably supplied at a temperature of 235 to 350° F. and a pressure of 40 to 450 p.s.i.g., and the water at a temperature of 50 to 350° F., and a pressure of 40 to 450 p.s.i.g. The water and polymer solution are then mixed using any conventional mixing means, e.g. a conventional mixing valve, a jet mixer, mixing nozzle, orifice mixer, or an in-line stirred mixer such as the Nettco Flomix mixer. It is also possible that only slight mixing is required which could be supplied by turbulence in the line. A mixture of polymer solution and water may thus be obtained for example at a temperature of 235 to 350° F. and a pressure of 40 to 450 p.s.i.g., under which conditions the mixture is subjected to the action of the electric field.

The electric field is applied to the polymer solution polar liquid mixture by any conventional means. For example, a single electrode and a grounded member which may be the treatment vessel itself or a pair of oppositely-charged electrodes may be used in the treatment vessel to provide a potential difference across the polymer solution-water mixture. The potential difference may be for example in the range of 1 to 50 kilovolts per inch of linear distance across the liquid being treated between the electrode and grounded member or oppositely-charged electrodes. A substantially constant or a variable potential difference may be used, but if variable its magnitude should periodically reach a value within the foregoing limits. For example, a variable potential difference may be used which oscillates between zero and a value within the foregoing limits 25 to 120 times per second. Conventional alternating current may also be used. In addition, the electric field may be homogeneous or inhomogeneous.

The polymer solution-water mixture is subjected to the electric field for example for a period in the range of 2 to 25 minutes during which time the droplets of the aqueous phase coalesce and collect at the bottom of the treatment vessel. The aqueous phase containing a substantial proportion of residue which has migrated from the polymer solution may then be removed from the treatment vessel either continuously or as a batch operation.

The process may be used to replace or substantially reduce the centrifugation and filtration operations which are usually carried out in connection with the formation of linear polymers of 1-olefins using a catalyst which tends to contribute undesirable residue to the final polymer, e.g. a catalyst comprising a metal or other ash-yielding component. The ash particles removed by the process generally have a diameter in the range of 0.1 to 75 microns.

The following example further illustrates the invention.

*Example*

Ethylene was polymerized at a temperature of 305° F. and at a pressure of 424 p.s.i.g., using cyclohexane as a solvent and chromium oxide supported on a carrier comprising 82.9% silica and 12.4% alumina as a catalyst, as described in U.S. Patent 2,825,721. The catalyst contained 4.7% of hexavalent chromium based on the weight of the catalyst. A solution was obtained from this reaction which contained 0.244% by weight of ash and 7.2% by weight of linear polyethylene solids. This solution was continuously fed at a rate of 2 gallons per minute and at a temperature of 250° F. and 100 p.s.i.g., to a motor mixing valve together with 0.08 gallon per minute of water at a temperature of 190° F. and a pressure of 105 p.s.i.g. to yield a water in polymer solution emulsion at 240° F. and 100 p.s.i.g. pressure. The emulsion was continuously ejected into a treatment vessel 8″ in diameter by 78″ in height. The point of ejection was 12 inches from the bottom flange of the vessel and above the polymer solution-water interface in the vessel, the latter being 10 inches from the bottom flange. The vessel contained a ½″ diameter vertical carbon steel electrode axially located and surrounded by a carbon steel grounded member 5½″ square. Both the electrode and the grounded member were 48″ long with their lower ends 18″ from the bottom flange of the vessel. A potential difference was applied between the electrode and the grounded member which oscillated between zero and 16 kilovolts (or 6.5 kilovolts per inch) 120 times per second. Polymer solution was withdrawn from the top of the vessel which contained only 0.014% by weight of ash. Water containing the remainder of the ash was withdrawn from the bottom of the vessel and from the interface, and discarded. The residence time of the polymer solution in the electric field was about 3.2 minutes.

While the treatment of the above example utilized only a single electrode and grounded member, it is also possible to use a plurality of electrodes and grounded members each provided with separate liquid injection and withdrawal means in a vessel of substantially larger diameter, to greatly increase the capacity of the treatment.

Although the electric field in the above example was supplied by an electrode in the form of a vertical rod, electrodes in a wide variety of configurations may be used to supply different patterns of electric field and liquid flow. For example, the electrodes may be in the form of an open grid system of the squirrel-cage type in which the electrodes are arranged in concentric circles within the vessel. By means of this system the electric field may impart a random motion to the material within the field.

It is to be understood that the foregoing detailed description is given merely by way of illustration and that many variations may be made therein without departing from the spirit of my invention.

Having described my invention, what I desire to secure by Letters Patent is:

1. A process which comprises
   (a) polymerizing ethylene in the presence of a hydrocarbon diluent and a catalyst comprising chromium oxide supported on at least one material selected from the group consisting of a silica, alumina, zirconia and thoria, and wherein at least part of the chromium is in the hexavalent state during the initial contacting of said ethylene with said catalyst,
   (b) separating the bulk of the resulting polyethylene solution from the bulk of the catalyst,
   (c) subsequently maintaining the temperature at from about 235° to 350° F., and the pressure at from about 40 to 450 p.s.i.g., during (d), (e), and (f),
   (d) mixing said polyethylene solution with a minor amount of water to form an emulsion, wherein water is the discontinuous phase,
   (e) subjecting said emulsion to the action of an electric field resulting from an applied potential difference, oscillating between zero and a value between about 1 and 50 kv. per inch linear distance from about 25 to 120 times per second, whereby the ash originally present in said polyethylene solution migrates to the aqueous phase, and at least a portion of said discontinuous aqueous phase coalesces and
   (f) separating said polyethylene solution from said aqueous phase.

2. A process for the purification of high molecular weight alpha olefin polymers, said alpha olefin having from 2 to 6 carbon atoms, which comprises:
   (1) forming an emulsion of
      (a) an inert normally liquid hydrocarbon solvent having a zero dipole moment containing dissolved therein a high molecular weight alpha-olefin polymer, said alpha-olefin having 2 to 6 carbon atoms, and catalyst residue, said catalyst being selected from the group consisting of (1) chromium oxide supported on at least one material selected from the group consisting of a silica, alumina, zirconia, and thoria and (2) a transition heavy metal halide and an aluminum alkyl; and
      (b) from about 0.1 to about 20 volume percent, based on said polymer solution (a) of a polar liquid having a dipole moment greater than zero, being immiscible with said polymer solution (a) and having a different density than said polymer solution (a), said polar liquid forming a discontinuous phase in said polymer solution (a); and
   (2) subjecting said emulsion to the action of an electric field resulting from an applied potential difference of between about 1 and 50 kilovolts per inch linear distance between electrodes, at a temperature of between about 235 and 350° F. and a pressure of between about 40 and 450 p.s.i.g. whereby
   (a) at least a portion of said catalyst residue is associated with said discontinuous polar liquid phase, and
   (b) at least a portion of said discontinuous polar liquid phase coalesces; and
(3) separating said coalesced polar liquid phase and associated catalyst residue from said polymer solution.

3. The process of claim 2, wherein said inert hydrocarbon solvent is selected from the group consisting of paraffins and cycloparaffins having from about 3 to 12 carbon atoms.

4. The process of claim 3, wherein said polar liquid is selected from the group consisting of water, ethylene glycol, and glycerol.

5. A process for the purification of a high molecular weight ethylene polymer which comprises:
(1) forming an emulsion of
   (a) an inert normally liquid hydrocarbon solvent selected from the group consisting of paraffins and cycloparaffins having from about 3 to 12 carbon atoms, containing dissolved therein 0.1 to 20 weight percent of a high molecular weight ethylene polymer and 0.005 to 2.0 percent of ash based on the weight of polymer, said ash being derived from a catalyst consisting essentially of chromium oxide supported on at least one material selected from the group consisting of a silica, alumina, zirconia and thoria; and
   (b) 0.1 to 20 volume percent, based on the polymer solution (a), of water, wherein said water forms a discontinuous phase in said polymer solution (a); and
(2) subjecting said emulsion to the action of an electric field resulting from an applied potential difference of between about 1 and 50 kilovolts per inch linear distance between electrodes at a temperature of 235 to 350° F. and a pressure of 40 to 450 p.s.i.g., for a period of between about 2 and 25 minutes whereby
   (a) at least a portion of said ash becomes associated with the discontinuous water phase, and
   (b) at least a portion of said discontinuous water phase coalesces; and
(3) separating said coalesced aqueous phase from said polymer solution.

References Cited by the Examiner

UNITED STATES PATENTS

| | | | |
|---|---|---|---|
| 2,355,678 | 8/44 | Roberts | 204—190 |
| 2,417,637 | 3/47 | Eddy | 204—190 |
| 2,905,659 | 9/59 | Miller | 260—94.95 |
| 2,914,453 | 11/59 | Wenerberg | 204—186 |
| 2,960,454 | 11/60 | Warner | 204—186 |
| 2,995,503 | 8/61 | Warner | 204—186 |
| 3,000,871 | 9/61 | Engel | 260—94.95 |
| 3,060,162 | 10/62 | Cornelis | 260—94.95 |
| 3,066,087 | 11/62 | Phillips | 204—190 |
| 3,066,130 | 11/62 | Grundmann | 260—94.95 |
| 3,090,777 | 5/63 | Antonsen | 260—94.95 |

FOREIGN PATENTS 232,132   12/58   Australia.

JOHN H. MACK, *Primary Examiner.*

MURRAY TILLMAN, WINSTON A. DOUGLAS,
*Examiners.*